Dec. 18, 1962  A. LAMESCH  3,068,618
RUNNER
Filed July 19, 1960
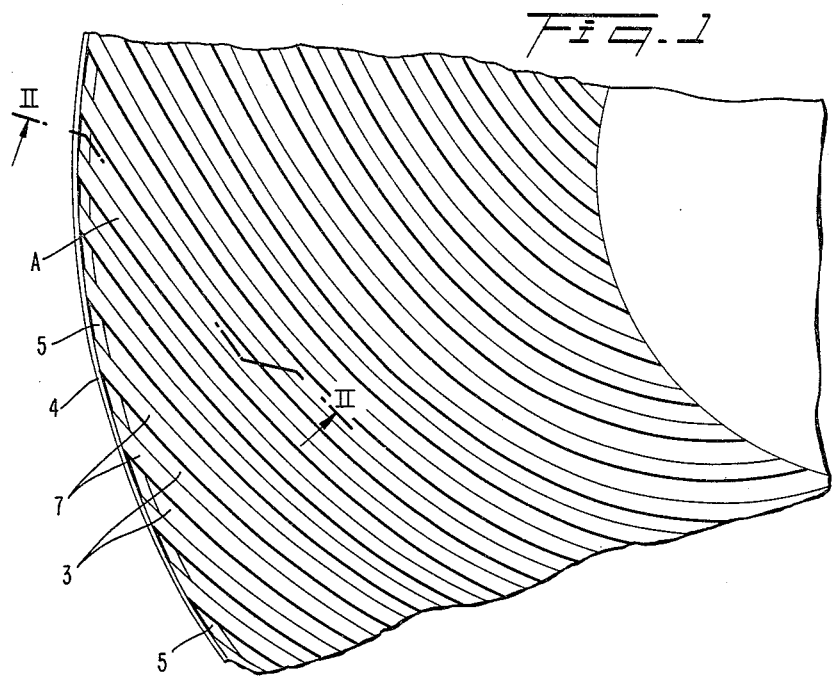
Fig. 1
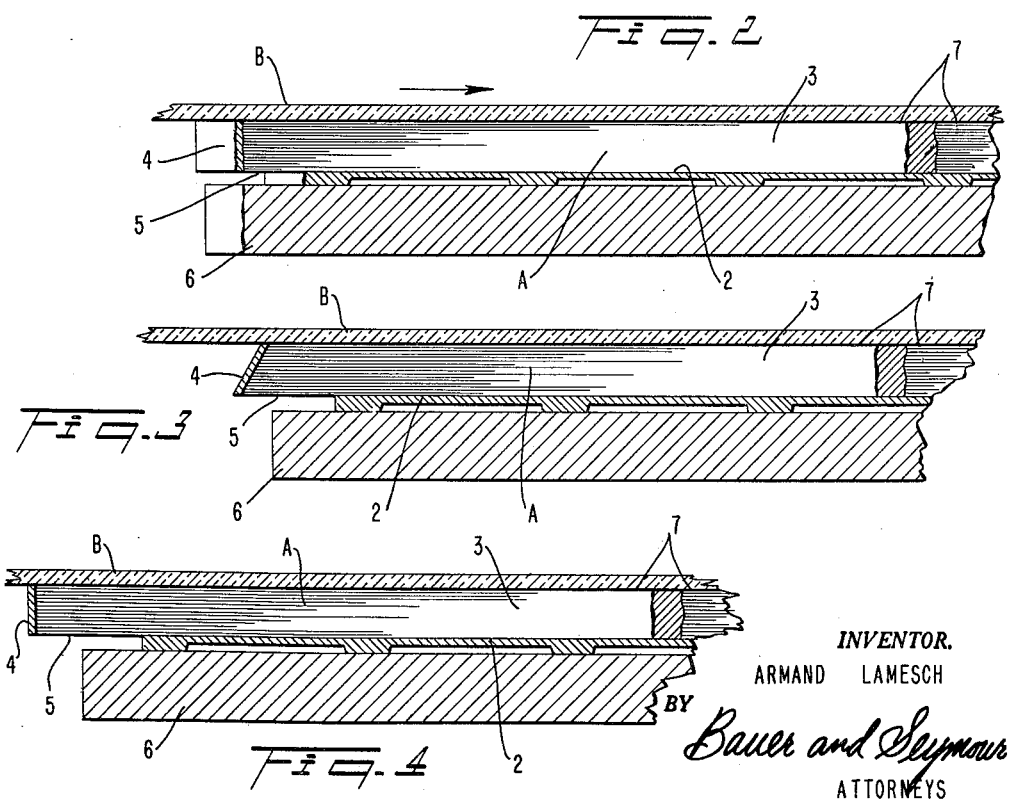
Fig. 2
Fig. 3
Fig. 4
INVENTOR.
ARMAND LAMESCH
BY Bauer and Seymour
ATTORNEYS

United States Patent Office 3,068,618
Patented Dec. 18, 1962

3,068,618
RUNNER
Armand Lamesch, Stolberg, Rhineland, Germany, assignor to Compagnie de Saint-Gobain, Neuilly-sur-Seine, France
Filed July 19, 1960, Ser. No. 43,878
Claims priority, application France July 22, 1959
6 Claims. (Cl. 51—209)

This invention relates to the surfacing of glass by rotary runners acting with abrasive simultaneously on the upper and lower faces of a glass sheet. These runners are usually provided, on their working faces, with alternate lands and grooves, spiralling outward toward the rim, the grooves being supplied with abrasive sludge and closed at their outer ends to retain the sludge for even distribution to the lands.

It sometimes happens that the glass breaks between the runners. Small fragments of the broken glass may fall into the grooves of the lower runner and are then violently projected from the ends of the grooves as soon as they pass beyond the edge of the sheet. The distance between the upper and lower runners being small the glass chips cannot escape and hit the edge of the glass sheet causing a new break. This disadvantage has been overcome by constructing the lower runner as hereinafter described.

In accordance with the invention the outer ends of the grooves of the lower runner are provided with relief ports which have a radial dimension sufficient to allow the glass fragments to escape downward, but still small enough to permit even feeding of the abrasive sludge. As the sludge also escapes through these ports this results in a regular flow of sludge along the grooves.

The above and further objects and novel features of the present invention will more fully appear from the following detailed description when the same is read in connection with the accompanying drawing. It is to be expressly understood, however, that the drawing is for the purpose of illustration only and is not intended as a definition of the limits of the invention, reference for this latter purpose being had primarily to the appended claims.

In the drawing, wherein like reference characters refer to like parts throughout the several views, FIG. 1 is a plan view, much reduced in scale, of a runner;

FIG. 2 is a vertical section on broken line II—II of FIG. 1;

FIG. 3 is a vertical section on line II—II of a modified form; and

FIG. 4 is a similar view of a further modification.

Referring to the numerals of the drawing, a glass sheet B, proceeding continuously in the direction of the arrow in FIG. 2, is worked above and below by opposed runners of which only the lower, A, is shown. The runner is made up of a runner carrier 6 and a runner plate 2 having grooves 3, lands 7, and a ribbed bottom which rests on the carrier 6. A circumferential band 4 closes the ends of the grooves.

Each of the grooves, preferably at its outer end, is provided in the novel construction, with a relief port 5, the inner and outer edges of which are circular arcs, the others following the edges of the grooves, making effectual quadrilaterals. The dimensions of these orifices may conveniently be 2 x 8 cm., which is large enough to permit the escape under the pressure of the abrasive sludge of the chips that fall into the grooves at the breaking of the glass. This permits the evacuation of all chips during the rotation of the runners and eliminates the secondary breakage which so often followed upon an initial break.

According to the modification of FIG. 3 the rim 4 is in the form of a downwardly flared conic section, discharging outside the carrier 6. An additional passage 7 is thus provided through which the glass chips are evacuated, centrifugal force acting to facilitate their removal.

In the modification of FIG. 4 the carrier 6 is of less diameter than the runner, thus providing an additional passage 8 through which the chips are easily removed.

As many apparently widely different embodiments of the present invention may be made without departing from the spirit and scope thereof, it is to be understood that the invention is not limited to the specific embodiments.

What is claimed is:

1. Apparatus adapted to the horizontal working of a surface from below, comprising a runner having an upper working face comprising alternate lands and grooves and baffle means to close the outer parts of the grooves, said grooves being provided adjacent the baffle means with apertures for the escape of detritus, a runner carrier to support the runner, and means spacing the outer edge portion of the runner containing the apertures from the confronting surface of the runner carrier.

2. Apparatus according to claim 1 in which the baffle means encircles the runner and is a downwardly flared conic section.

3. Apparatus according to claim 1, wherein the runner carrier is of lesser radius than the runner.

4. A metal rotary runner utlized for the grinding of the under face of a glass band in continuous translation in which the bottom of the groove separating two successives grinding lands comprises, at its peripheral end, an opening of slight radially measured width, the side of the runner being constituted by a metal sheet fixed to the peripheral ends of the lands.

5. A metal rotary runner according to claim 4 in which the sheet constituting the side of the runner is in the form of a cylinder with generating lines parallel to the axis of the runner.

6. A metal rotary runner according to claim 4 in which the edge of the opening on the side of the axis of the runner is a portion of an arc of a circle concentric to the runner.

References Cited in the file of this patent
UNITED STATES PATENTS
2,820,334    Touvay ------------------ Jan. 21, 1958